United States Patent
Brooking et al.

(10) Patent No.: US 10,394,680 B2
(45) Date of Patent: Aug. 27, 2019

(54) TECHNIQUES FOR TRACKING GRAPHICS PROCESSING RESOURCE UTILIZATION

(71) Applicant: Microsoft Technology Licensing, LLC, Redmond, WA (US)

(72) Inventors: Cole James Brooking, Woodinville, WA (US); Brian Bo Rasmussen, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/873,641

(22) Filed: Jan. 17, 2018

(65) Prior Publication Data

US 2019/0220383 A1    Jul. 18, 2019

(51) Int. Cl.
| | | |
|---|---|---|
| *G06F 11/32* | (2006.01) | |
| *G06F 9/48* | (2006.01) | |
| *G06F 9/451* | (2018.01) | |
| *G06T 15/00* | (2011.01) | |
| *G06F 11/30* | (2006.01) | |
| *G06T 1/60* | (2006.01) | |

(52) U.S. Cl.
CPC ............ *G06F 11/324* (2013.01); *G06F 9/451* (2018.02); *G06F 9/4812* (2013.01); *G06F 11/3037* (2013.01); *G06T 1/60* (2013.01); *G06T 15/005* (2013.01)

(58) Field of Classification Search
CPC ...... G06F 11/324; G06F 9/4812; G06F 9/451; G06F 11/3037; G06T 1/60; G06T 15/005
See application file for complete search history.

(56) References Cited

U.S. PATENT DOCUMENTS

| | | | | |
|---|---|---|---|---|
| 6,701,420 | B1* | 3/2004 | Hamilton | G06F 12/023 |
| | | | | 707/999.202 |
| 8,780,114 | B1* | 7/2014 | Jackey | G06F 11/323 |
| | | | | 345/440 |
| 8,872,823 | B2* | 10/2014 | Gould | G06T 15/005 |
| | | | | 345/426 |

(Continued)

FOREIGN PATENT DOCUMENTS

WO    2016126527 A1    8/2016

OTHER PUBLICATIONS

Hou, et al., "Debugging GPU stream programs through automatic data flow recording and visualization", In Proceedings of the ACM Transactions on Graphics, Dec. 1, 2009, 12 Pages.

(Continued)

*Primary Examiner* — Maurice L. McDowell, Jr.
*Assistant Examiner* — Donna J. Ricks
(74) *Attorney, Agent, or Firm* — Arent Fox LLP

(57) ABSTRACT

Examples described herein generally relate to reporting memory resource access by a graphics processing unit (GPU). A list of memory resources allocated for the GPU can be received by a memory tracking application. An indication of memory resource utilization based on the list of memory resources can be displayed on an interface. The memory tracking application can also receive, from the GPU, multiple indications that one or more of the memory resources allocated for the GPU are accessed, and can update the indication of memory resource utilization based at least in part on the multiple indications.

20 Claims, 6 Drawing Sheets

(56) References Cited

U.S. PATENT DOCUMENTS 9,582,919 B2 2/2017 Gould et al.
2013/0326166 A1* 12/2013 Desai ................... G06F 9/5016
                                                              711/158

OTHER PUBLICATIONS

"International Search Report and Written Opinion Issued in PCT Application No. PCT/US2018/068092", dated May 20, 2019, 14 Pages.

* cited by examiner

TECHNIQUES FOR TRACKING GRAPHICS
PROCESSING RESOURCE UTILIZATION

BACKGROUND

Use of computing devices is becoming more ubiquitous by the day. Computing devices range from standard desktop computers to wearable computing technology and beyond. One area of computing devices that has grown in recent years is in the context of image rendering, such as rendering of games, video streams, etc., which typically rely on a graphics processing unit (GPU) to render graphics from a computing device to a display device based on rendering instructions received from the computing device. Image rendering for these purposes can be extremely resource intensive, and available system resources often limit performance of the rendering. Thus, tools for indicating resource usage as a result of image rendering can be useful for developers to determine areas of high resource utilization and possibly implement more efficient instructions, parameters, etc. to improve application performance and user experience.

Some tools for this purpose cause the GPU to tint textures according to Mip level, allowing a developer to visually inspect resource usage based on the tinting, which requires additional resource usage to execute the shader and user interaction to view and recall a tint associated with levels of resource usage. Other tools add shader instrumentation to track resource usage, which can also require additional resources and add implementation complexity.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a method for reporting memory resource usage by a graphics processing unit (GPU) is provided. The method includes receiving, by a memory tracking application, a list of memory resources allocated for the GPU, displaying, by the memory tracking application, an indication of memory resource utilization based on the list of memory resources, receiving, by the memory tracking application and from the GPU, multiple indications that one or more of the memory resources allocated for the GPU are accessed, and updating, by the memory tracking application, the indication of memory resource utilization based at least in part on the multiple indications.

In another example, A computing device for reporting memory resource usage by a GPU is provided. The computing device includes a memory storing one or more parameters or instructions for executing an operating system and one or more applications including a memory tracking application, and at least one processor coupled to the memory. The at least one processor is configured to receive, by the memory tracking application, a list of memory resources allocated for the GPU, display, by the memory tracking application, an indication of memory resource utilization based on the list of memory resources, receive, by the memory tracking application and from the GPU, multiple indications that one or more of the memory resources allocated for the GPU are accessed, and update, by the memory tracking application, the indication of memory resource utilization based at least in part on the multiple indications.

In another example, a computer-readable medium, including code executable by one or more processors for reporting memory resource usage by a GPU, is provided. The code includes code for receiving, by a memory tracking application, a list of memory resources allocated for the GPU, displaying, by the memory tracking application, an indication of memory resource utilization based on the list of memory resources, receiving, by the memory tracking application and from the GPU, multiple indications that one or more of the memory resources allocated for the GPU are accessed, and updating, by the memory tracking application, the indication of memory resource utilization based at least in part on the multiple indications.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

Figure 1:
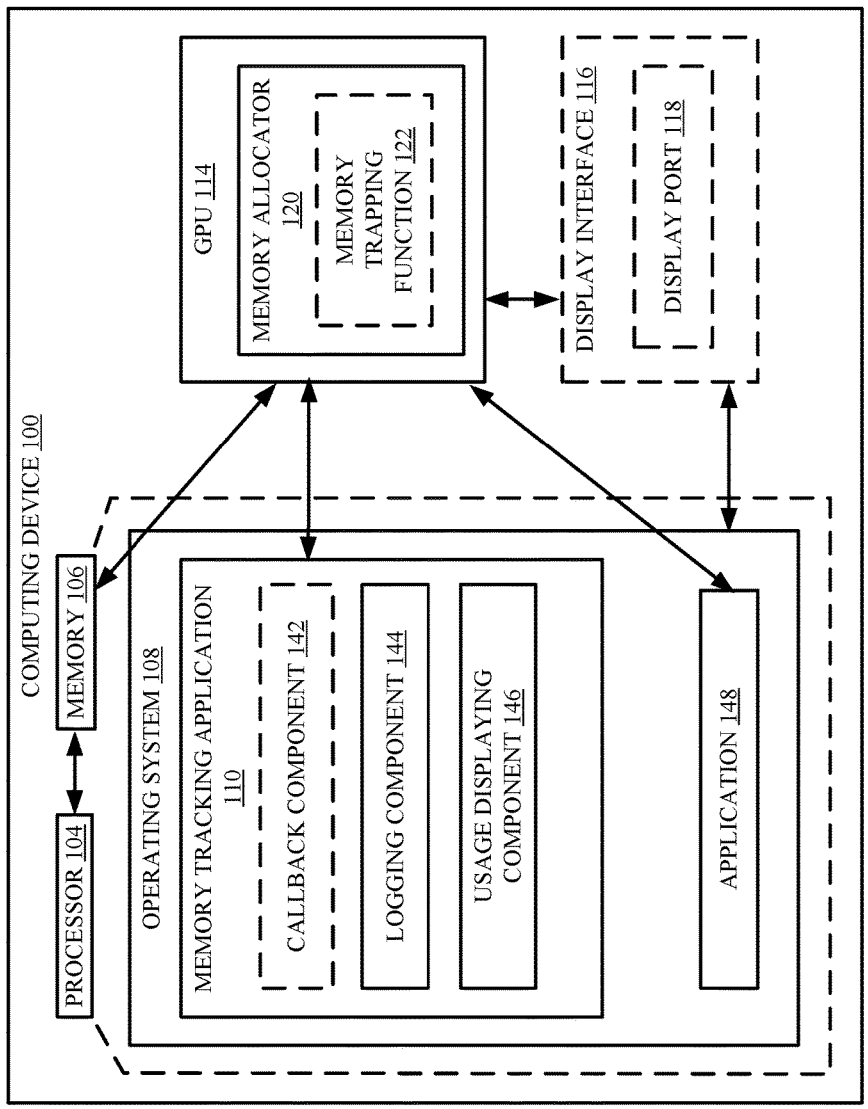
FIG. 1 is a schematic diagram of an example of a computing device for displaying images and determining memory resource utilization by a graphics processing unit (GPU) in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to determining and/or displaying memory resource usage by a graphics processing unit (GPU). The GPU can report allocated memory resources to a memory tracking application, and the memory tracking application can display an indication of memory resource utilization based on the reported allocated memory resources. In addition, the GPU can report, over a duration, memory accesses associated with the allocated memory resources, and the memory tracking application can update or otherwise modify the display of the indication of memory resource utilization based on the reported memory accesses.

In a specific example, a memory trapping function can be enabled to facilitate reporting of memory accesses/modifications by the GPU. The memory trapping function can determine when portions of memory are accessed, modified, etc., and for a given portion of memory can report at least the occurrence of the modification. For example, the memory trapping function can be implemented in a memory allocator of the GPU, and can notify the memory tracking application, which may be operating on a central processing unit (CPU), when memory is modified by a graphics processing operation performed by the GPU (e.g., via an interrupt handler or channel). The memory tracking application can accordingly store memory accessing information for displaying indications of memory resource utilization.

In one example, the memory tracking application can display the indications of memory resource utilization as an identification of memory being accessed, an associated GPU resource that allocated the memory, etc., which can be identified in real-time (or near real-time) based on the GPU notifying the memory tracking application of the memory access, and the memory tracking application displaying an indication associated with the memory access. In another example, the memory tracking application can determine which resources are accessed by the GPU and compare to which resources are allocated for the GPU to identify a list of unutilized memory resources. In this example, the memory tracking application can display the indications of memory resource utilization as including the unutilized (or underutilized) memory resources. In either case, this can enable developers to view memory resource utilization by a GPU as an application that uses the GPU for rendering executes, and thus identify functions that exhibit high resource utilization and/or that have a high level of unutilized (or underutilized) resources, determine ways to add efficiency to the functions, add content to the functions, etc. In addition, using a memory trapping function can operate with very little overhead as compared to otherwise analyzing rendering instructions sent to the GPU 114, querying the GPU 114 for memory accessing information, etc.

Figure 2:
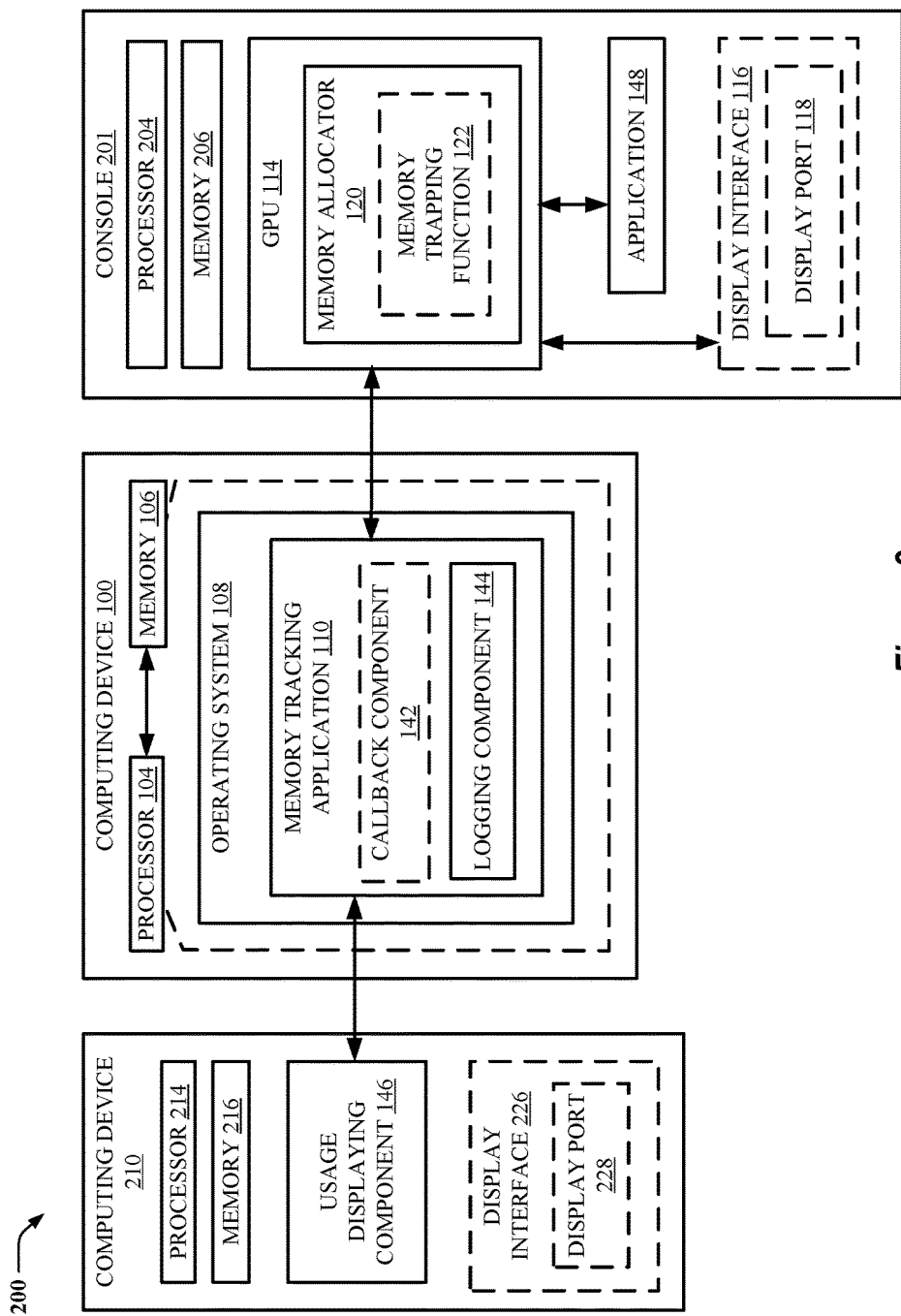
FIG. 2 is a schematic diagram of an example of multiple computing devices and a console for displaying images and determining memory resource utilization by a GPU in accordance with examples described herein.
Figure 3:
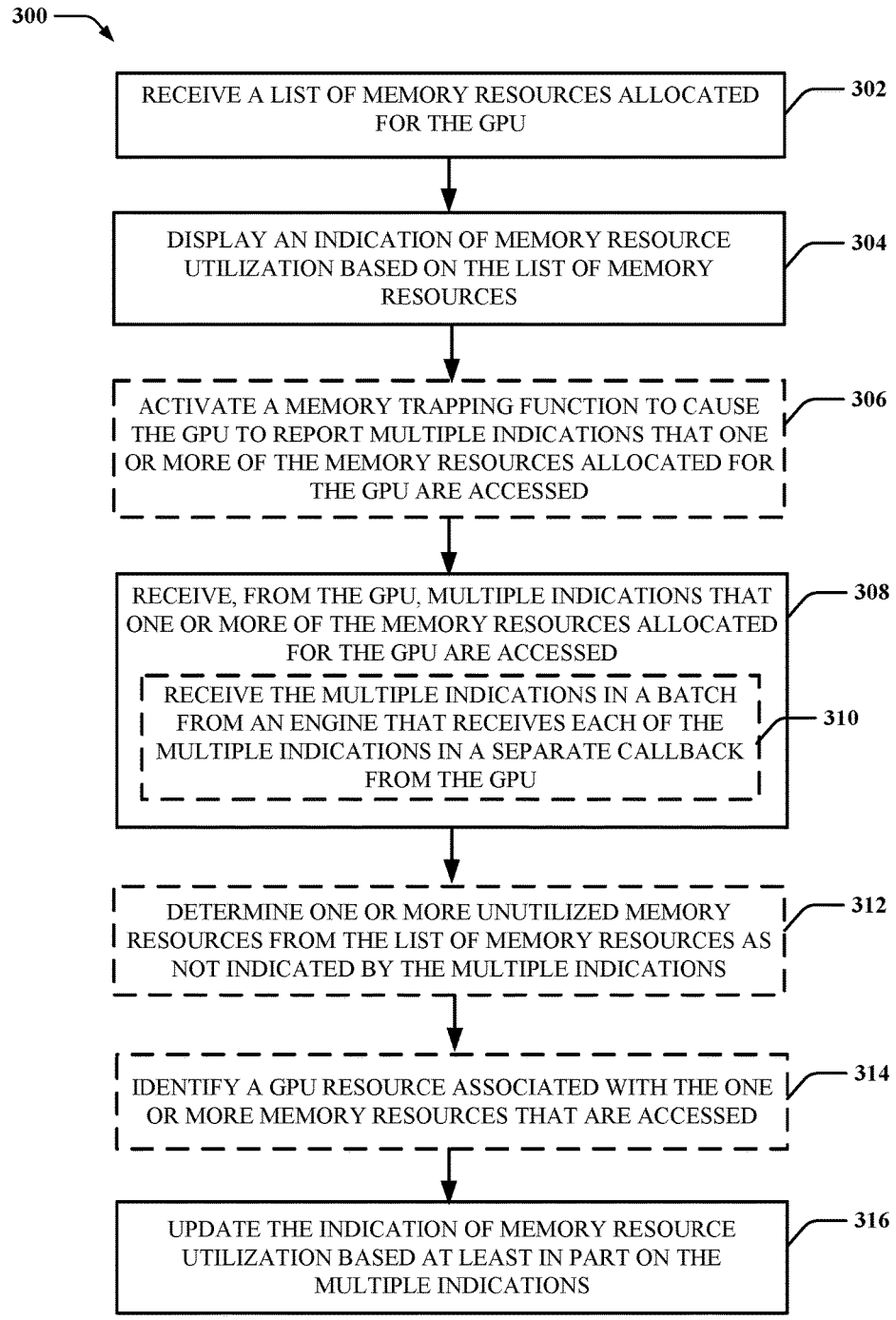
FIG. 3 is a flow diagram of an example of a method for determining and reporting memory usage by a GPU in accordance with examples described herein.
Figure 4:
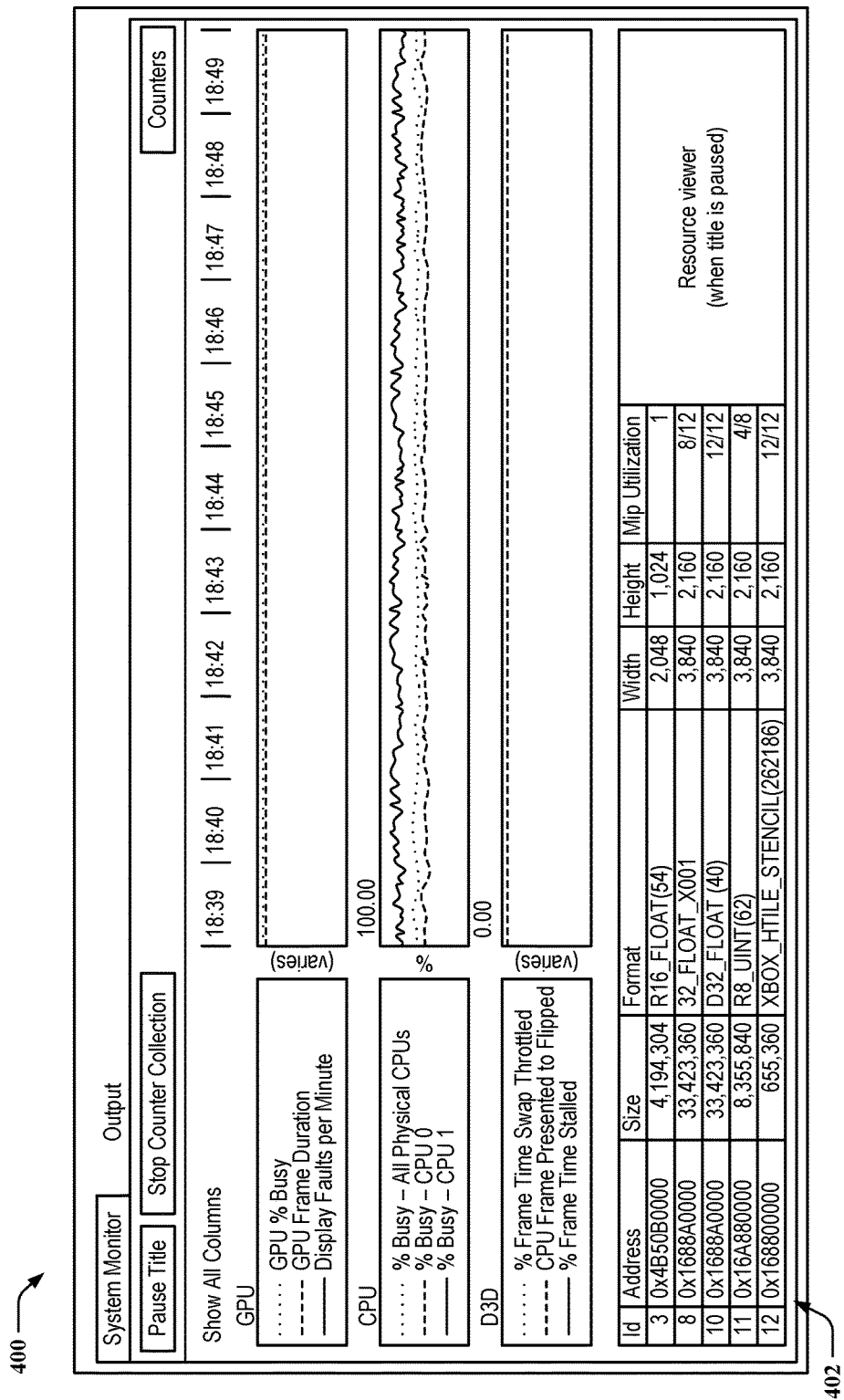
FIG. 4 illustrates an example of an interface for displaying memory usage by a GPU in accordance with examples described herein.

Turning now to FIGS. 1-6, examples are depicted with reference to one or more components and one or more methods that may perform the actions or operations described herein, where components and/or actions/operations in dashed line may be optional. Although the operations described below in FIGS. 3 and 4 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100 and/or related components for monitoring and/or reporting resource usage by a GPU. For example, computing device 100 can include or can otherwise be coupled with a processor 104 and/or memory 106, where the processor 104 and/or memory 106 can be configured to execute or store instructions or other parameters related to determining and/or reporting resource usage by a GPU, as described herein. Computing device 100 can execute an operating system 108 (e.g., via processor 104 and/or memory 106) for providing an environment for executing one or more applications, such as one or more memory tracking applications 110 that determine and report resource usage by a GPU, one or more applications 148 that provide the GPU with rendering instructions, etc. The application 148 can include substantially any application that generates streams of images for displaying at a frame rate, such as a game, a video streaming service, etc., for example. The computing device 100 can also include a GPU 114 for processing rendering instructions, and/or communicating associated commands to a display interface 116 to cause display of one or more images on a display, which may be coupled to the computing device 100 via a display port.

In an example, display interface 116 can be communicatively coupled with the processor 104 and/or memory 106 for communicating with a display (not shown) via a display port 118. Display port 118, as referred to herein, can include one or more of various types of ports, including a high definition multimedia interface (HDMI) port, a display serial interface (DSI) port, a mobile industry processor interface (MIPI) DSI port, a universal serial bus (USB) port, a Firewire port, or other embedded or external wired or wireless display ports that can allow communications between computing device 100 and the display.

In one example, GPU 114 can be part of the display interface 116 (e.g., a processor on a circuit board of the display interface 116). In another example, GPU 114, display interface 116, etc., can be integrated with processor 104. Substantially any combination of hardware can be possible such that GPU 114, display interface 116, etc., can communicate with processor 104 via a bus to facilitate providing the rendering instructions to the GPU 114. GPU 114 can process the rendering instructions to render an image, and can initiate display of at least a portion of the image on the display by transmitting associated signals to the display via display port 118 of display interface 116.

In an example, GPU 114 can include a memory allocator 120 for allocating portions of memory (e.g., memory 106) for use in executing graphics processing operations. For example, the memory allocator 120 may request portions of memory from a memory controller associated with memory 106, such as to obtain physical memory corresponding to virtual memory addresses specified to the GPU 114 for performing graphics processing operations. The memory allocator 120 can also optionally include a memory trapping function 122 for detecting and reporting when portions of memory 106 are modified by the GPU 114. For example, the memory trapping function 122 can provide an indication of the portion of memory modified (e.g., at one or more levels of granularity, such as a page of memory, which may be of a configured size, a byte of memory, etc.) and/or an indication of a memory accessing command (e.g., read, write, etc.). In addition, memory trapping function 122 may provide a mechanism for activating the memory trapping and for specifying a callback function, interrupt handler or channel, etc. for the memory trapping function 122 to instantiate when memory modification is detected.

Memory tracking application 110 can include an optional callback component 142, which may be the callback function, interrupt handler or channel, etc., and may be specified when activating the memory trapping function 122, a logging component 144 for logging, e.g., in memory 106, memory accessing commands and related memory resources reported by the memory trapping function 122, and/or a usage displaying component 146 for displaying one or more indications of resource usage by the GPU 114, which may be based on information received from the memory trapping function 122 (e.g., via callback component 142) and/or other information received from the GPU 114.

In one example, application 148 can operate to provide rendering instructions to the GPU 114 for rendering images related to the application 148. For example, application 148 can be a game, video, or other application that can leverage the GPU 114 for graphics processing. In this example, memory tracking application 110 can receive an indication of resources allocated for the GPU 114 (e.g., via memory allocator 120), which may indicate the resources allocated, a process or GPU resource that allocated the resources, and/or the like. For example, a GPU resource can refer to a shader, texture, or other pipeline state objects (PSOs) (e.g., which can include a collection of data that sets up states for the GPU in order to process API calls). Memory tracking application 110 can also receive notifications from the GPU 114 of each time an allocated resource is accessed, which can occur via the memory trapping function 122 calling back to the callback component 142 registered by the memory tracking application 110 or other notification, function call, etc. from/to the GPU 114. Logging component 144 can store the indications and/or related information (e.g., in memory 106) for subsequent retrieval, which can allow the memory tracking application 110 to provide or display metrics related to resource usage by the GPU 114.

In this regard, for example, memory tracking application 110 can include the usage displaying component 146 for displaying, e.g., via display interface 116 or another display interface, resource usage indications related to GPU 114 performance. For example, usage displaying component 146 can display each of the memory accesses received from the memory trapping function 122, a list of resources allocated for the GPU 114, a list of resources allocated but not utilized by the GPU 114 (e.g., based on a difference between the list of resources allocated for the GPU 114 and the memory accesses received via memory trapping function 122), etc. Usage displaying component 146 can display the resource usage indications on a graphical user interface (GUI) or other output to allow a developer to visualize resources being used by the GPU 114 when the application 148 performs certain functions. Thus, for example, the developer can execute the application 148 to perform a certain function in a corresponding duration, and can use the memory tracking application 110 to visualize resource usage by the GPU 114 during the duration.

FIG. 2 is a schematic diagram of an example of a system 200 for monitoring and/or reporting resource usage by a GPU. For example, system 200 can include various components, such as a computing device 100 that includes or can otherwise be coupled with a processor 104 and/or memory 106, where the processor 104 and/or memory 106 can be configured to execute or store instructions or other parameters related to determining and/or reporting resource usage by a GPU, as described herein. Computing device 100 can execute an operating system 108 (e.g., via processor 104 and/or memory 106) for providing an environment for executing one or more applications, such as one or more memory tracking applications 110 that determine and report resource usage by a GPU. System 200 can also include a console 201 that can include or can otherwise be coupled with a separate processor 204 and/or memory 106 that can be configured to execute one or more applications 148 that generate streams of images for displaying at a frame rate, such as a game, a video streaming service, etc., for example. The console 201 can also include a GPU 114, e.g., located remotely from computing device 100, for processing rendering instructions, and/or communicating associated commands to a display interface 116 to cause display of one or more images on a display, which may be coupled to the console 201 via a display port.

In an example, display interface 116 can be communicatively coupled with the processor 204 and/or memory 206 for communicating with a display (not shown) via a display port 118. Display port 118, as referred to herein, can include one or more of various types of ports, including a high definition multimedia interface (HDMI) port, a display serial interface (DSI) port, a mobile industry processor interface (MIPI) DSI port, a universal serial bus (USB) port, a Firewire port, or other embedded or external wired or wireless display ports that can allow communications between console 201 and the display, as similarly described in FIG. 1.

In one example, GPU 114 can be part of the display interface 116 (e.g., a processor on a circuit board of the display interface 116). In another example, GPU 114, display interface 116, etc., can be integrated with processor 104. Substantially any combination of hardware can be possible such that GPU 114, display interface 116, etc., can communicate with processor 104 via a bus to facilitate providing the rendering instructions to the GPU 114. GPU 114 can process the rendering instructions to render an image, and can initiate display of at least a portion of the image on the display by transmitting associated signals to the display via display port 118 of display interface 116.

In an example, GPU 114 can include a memory allocator 120 for allocating portions of memory (e.g., memory 106) for use in executing graphics processing operations. For example, the memory allocator 120 may request portions of memory from a memory controller associated with memory 206, such as to obtain physical memory corresponding to virtual memory addresses specified to the GPU 114 for performing graphics processing operations. The memory allocator 120 can also optionally include a memory trapping function 122 for detecting and reporting when portions of memory 206 are modified by the GPU 114. For example, the memory trapping function 122 can provide an indication of the portion of memory modified (e.g., at one or more levels of granularity, such as a page of memory, which may be of a configured size, a byte of memory, etc.) and/or an indication of a memory accessing command (e.g., read, write, etc.). In addition, memory trapping function 122 may provide a mechanism for activating the memory trapping and for specifying a callback function, interrupt handler or channel, etc. for the memory trapping function 122 to instantiate when memory modification is detected.

Memory tracking application 110 can include an optional callback component 142, as described, which may be the callback function, interrupt handler or channel, etc., and may be specified when activating the memory trapping function 122 by the memory tracking application 110, and a logging component 144 for logging, e.g., in memory 106, memory accessing commands and related memory resources reported by the memory trapping function 122.

Additionally, in this example, system 200 includes a computing device 210 that can include or can otherwise be coupled with a separate processor 214 and/or memory 216 that can be configured to execute a usage displaying component 146 for displaying one or more indications of resource usage by the GPU 114, which may be based on information received from the memory trapping function 122. For example, usage displaying component 146 can display the indications on a display (not shown) via display interface 226 and/or display port 228, which may be similar to display interface 116 and display port 118 described herein.

In one example, application 148 can operate to provide rendering instructions to the GPU 114 for rendering images related to the application 148. For example, application 148 can be a game, video, or other application that can leverage the GPU 114 for graphics processing. In this example, memory tracking application 110 can receive an indication of resources allocated for the GPU 114 (e.g., via memory allocator 120), which may indicate the resources allocated, a process or GPU resource (e.g., a texture, shader, etc.) that allocated the resources, and/or the like, based on requesting this information from the GPU 114. For example, GPU 114 may execute on a development platform that enables memory tracking application 110 to request such information via an application programming interface (API) or other request. Memory tracking application 110 can also receive notifications from the GPU 114 of each time an allocated resource is accessed, which can occur via the memory trapping function 122 calling back to the callback component 142 registered by the memory tracking application 110 or other notification, function call, etc. from/to the GPU 114. Logging component 144 can store the indications and/or related information (e.g., in memory 106) for subsequent retrieval, which can allow the memory tracking application 110 to provide metrics related to resource usage by the GPU 114.

In this regard, for example, memory tracking application 110 can provide information to usage displaying component 146 for displaying, e.g., via display interface 226 or another display interface, resource usage indications related to GPU 114 performance. For example, usage displaying component 146 can receiving indications of memory accessing from the memory tracking application 110 as received from the GPU 114, in a batch of multiple indications, etc. In any case, as described, usage displaying component 146 can display each of the memory accesses received from the memory trapping function 122, a list of resources allocated for the GPU 114, a list of resources allocated but not utilized by the GPU 114 (e.g., based on a difference between the list of resources allocated for the GPU 114 and the memory accesses received via memory trapping function 122), etc.

FIG. 3 is a flowchart of an example of a method 300 for determining and/or reporting resource usage by a GPU. For example, method 300 can be performed by a computing device 100, console 201, and/or computing device 210, and is accordingly described with reference to FIGS. 1 and 2, as a non-limiting example of environments for carrying out method 300.

In method 300, at action 302, a list of memory resources, allocated for the GPU, can be received. In an example, memory tracking application 110, e.g., in conjunction with processor 104, memory 106, etc., can receive the list of memory resources allocated for the GPU (e.g., GPU 114). For example, memory tracking application 110 can receive the list of memory resources from the GPU 114. In one example, memory allocator 120 can allocate memory resources in memory 106, 206 for executing one or more shaders, applying or generating one or more textures, or for substantially any such GPU resource used in generating images based on rendering instructions (e.g., as received from application 148). For example, logging component 144 can store the list of memory resources allocated for the GPU for subsequent association of memory accesses by the GPU 114 with corresponding GPU resources (e.g., shaders, textures, etc.) that allocated the memory resources, as described herein. In one example, a CPU, such as processor 104, 204, can allocate the resources in memory 106, 206 for the GPU 114, and pass an indication of memory addresses (e.g., a range of memory addresses) to the GPU 114.

As described, for example, application 148 can utilize GPU 114 to render images by providing sets of rendering instructions to the GPU 114 for processing. These instructions can cause the GPU 114 to allocate certain memory resources via memory allocator 120 for generating or executing one or more GPU resources based on the rendering instructions, such as shaders, textures, etc. Memory allocator 120, for example, can track the allocated memory resources and the corresponding GPU resource that allocated the memory resources. In this regard, memory allocator 120 can also be configured to provide a list of the allocated memory resources (e.g., virtual addresses of the memory resources in memory 106 and/or 206), and an indication of the GPU resource that allocated the memory resources, upon request. In this example, memory tracking application 110 can request the list of allocated memory resources and/or corresponding GPU resources from the GPU 114. In one example, the memory tracking application 110 can submit this request to the GPU 114 based on an activation command received from an interface (e.g., activation of a process start indication on an interface, initializing of the memory tracking application 110 or related interface, etc., as described below in reference to FIG. 4).

In method 300, at action 304, an indication of memory resource utilization can be displayed based on the list of memory resources. In an example, usage displaying component 146, e.g., in conjunction with processor 104, 214, memory 106, 216, memory tracking application 110, etc., can display the indication of memory resource utilization based on the list of memory resources. For example, usage displaying component 146 can display a list of the allocated memory resources, a size of allocated memory resources, and/or the corresponding GPU resources that allocated the memory resources, etc. This can allow for tracking the memory resources allocated for each GPU resource (e.g., a given shader, texture, etc.). In one example, this can include displaying the indication of the memory resource utilization for a given GPU resource where the GPU resource can be selectable via an interface. This can allow for viewing the list of allocated memory resources, number or size of memory resources, etc. allocated for the given GPU resource.

In method 300, optionally at action 306, a memory trapping function can be activated to cause the GPU to report multiple indications that one or more of the memory resources allocated for the GPU are accessed. In an example, memory tracking application 110, e.g., in conjunction with processor 104, 204, memory 106, 206, etc., can activate the memory trapping function (e.g., memory trapping function 122 on the GPU 114) to cause the GPU (e.g., GPU 114) to report multiple indications that the one or more of the memory resources allocated for the GPU are accessed. For example, memory tracking application 110 can activate the memory trapping function 122 via a function call to the GPU 114. Memory tracking application 110 may include a handle or other identifier of the callback component 142 in the activation request/command send to the GPU 114 to allow the memory trapping function 122 to call the callback component 142 when memory accessing, modification, and/or the like, is detected. In addition, for example, memory tracking application 110 may indicate portions of memory (e.g., pages) for which to activate the memory trapping function 122, and/or GPU 114 can activate the memory trapping function 122 on the specified portions or otherwise on all portions relevant to the graphics processing operations by the GPU (and/or possibly operations on the same memory resources by a CPU, such as processor 104, 204 applying other graphics operations to memory resources in memory 106, 206 being tracked). In one example, memory tracking application 110 may indicate certain memory resources, GPU resources, etc. for which memory trapping is desired for tracking memory accessing by the GPU 114.

Thus, in one example, the processor 104, 204 (e.g., via application 148 or another application) can also execute graphics processing operations that result in modifying portions of memory 106, 206 (e.g., whether in the computing device 100 of FIG. 1, console 201 of FIG. 2, etc.). In this example, a memory trapping function, not shown, can also be activated for the processor (e.g., CPU) 104, 204. In one example, memory trapping function 122 may be able to detect modification of the memory 106, 206 regardless of whether GPU 114 or processor 104 (in FIG. 1) or 204 (in FIG. 2) modifies the memory, and can act as a memory trapping function for both operations.

In method 300, at action 308, multiple indications that one or more of the memory resources allocated for the GPU are accessed can be received from the GPU. In an example, memory tracking application 110, e.g., in conjunction with processor 104, 204, memory 106, 206, callback component 142, etc., can receive, from the GPU (e.g., GPU 114), the multiple indications that one or more of the memory resources allocated for the GPU are accessed. For example, memory tracking application 110 can receive this information based on requesting the indications from the GPU 114 or otherwise receiving notifications from the GPU 114 (e.g., via a callback from the GPU 114. Thus, in one example, where memory trapping function 122 is activated, the memory trapping function 122 can call back to the callback component 142 (e.g., via a registered interrupt channel, an indicated callback function, etc.) each time memory resources are accessed by the GPU 114 (and/or when a threshold number of resources are accessed, periodically to indicate resources accessed since a previous period of time, etc.), where the accessing can correspond to one or more of reading memory resources, writing to memory resources, etc.

For example, the GPU 114 can access the memory resources (e.g., in memory 106, 206) in executing rendering instructions received from the application 148. For example, the rendering instructions may cause GPU 114 to generate or execute GPU resources, such as shaders, textures, etc. to produce images for display on a display device (e.g., via display interface 116). Executing the GPU resources may cause the GPU 114 to access the memory resources to perform various read/write or other operations. Where the memory trapping function 122 is activated, it can detect and report such operations performed to the memory resources. For example, this can include reporting the operations at a certain level of granularity (e.g., for a page of memory). In one example, a page of memory can correspond to a logical grouping of memory resources based on a size, such as 64 kilobytes (KB), 4 KB, etc. In an example, memory trapping function 122 can detect modification of a page of memory (or a portion of the page), and in the callback, memory trapping function 122 can indicate the operation (e.g., read, write, etc.), the memory accessed (e.g., a virtual address of the memory, the page of memory, etc.), and/or the like. Memory tracking application 110 can store or otherwise track the memory accessing performed by the GPU 114.

In one example, usage displaying component 146 can additionally or alternatively, e.g., via processor 104, 214, memory 106, 216, memory tracking application 110, etc., receive the multiple indications, from the GPU 114, that the one or more of the memory resources allocated for the GPU are accessed. Specifically, for example, usage displaying component 146 can receive the multiple indications from memory tracking application 110. In one example, this can optionally include, at action 310, receiving the multiple indications in a batch from an engine that receives each of the multiple indications in a separate callback from the GPU. In this example, usage displaying component 146 can receive the multiple indications in the batch from the engine, where the engine can include or can be a part of memory tracking application 110, that receives each of the multiple indications in the separate callback from the GPU 114 (e.g., callback component 142). Thus, for example, memory tracking application 110 can receive and store (e.g., via logging component 144) the multiple indications received from the GPU 114 (e.g., in memory 106). In this example, memory tracking application 110 can provide the batch of indications to the usage displaying component 146 periodically, based on one or more events (e.g., a request from the usage displaying component 146), etc., which can include providing the multiple indications received since the last time the memory tracking application 110 sent indications to the usage displaying component 146. In one example, usage displaying component 146 can request the indications from the memory tracking application 110 based on detecting activation of an interface component, as described with respect to FIG. 4 below, to obtain memory accesses for the GPU 114 for one or more corresponding GPU resources, all GPU resources, or otherwise.

Receiving the indications in this regard can allow the memory tracking application 110, usage displaying component 146, etc. to detect and/or report various memory resource utilization metrics, such as a number of memory accesses performed by a GPU resource, an amount of memory modified by a GPU resource, allocated but unutilized memory resources, and/or the like, over a duration. The various metrics can be computed and stored or displayed on an interface to allow for viewing the metrics and possibly determining possible efficiencies to provide improved consumption of resources by the GPU resources. For example, the duration may be indicated by the memory tracking application 110 or may otherwise be specified by the application 148 (e.g., by running the application 148 to execute and provide rendering instructions to the GPU 114 for the duration). In one example, as described further herein, the memory tracking application 110 can be initialized, and the application 148 can be operated to run through a desired function (e.g., a scene of a game) to cause rendering instructions to be sent to the GPU 114, and corresponding memory accesses to be tracked via the memory tracking application 110 for analysis thereof.

In method 300, optionally include at action 312, one or more unutilized memory resources can be determined from the list of memory resources as not indicated by the multiple indications. In an example, memory tracking application 110, e.g., in conjunction with processor 104, memory 106, etc., can determine the one or more unutilized memory resources from the list of memory resources as not indicated by the multiple indications. In an example, memory tracking application 110 can obtain the list of memory resources allocated for the GPU 114 (e.g., for a given GPU resources or otherwise), as described above, and can determine resources (e.g., pages of memory) in the list of memory resources for which no indication of memory access is received from the GPU 114, which can indicate that the resources are unutilized by the GPU 114 or corresponding GPU resource (e.g., shader, texture, etc.), which can facilitate determining an inefficiency in the GPU 114 or corresponding GPU resource.

In method 300, optionally at action 314, a GPU resource associated with the one or more memory resources that are access can be identified. In an example, memory tracking application 110, e.g., in conjunction with processor 104, memory 106, etc., can identify the GPU resource associated with the one or more memory resources that are accessed. In an example, memory tracking application 110 can determine the GPU resource associated with the one or more accessed memory resources based at least in part on locating the one or more accessed memory resources (e.g., based on virtual address) in the list of memory resources received for a given GPU resource (e.g., as allocated for the given GPU resource), as described above.

In method 300, at action 316, the indication of memory resource utilization can be updated based at least in part on the multiple indications. In an example, memory tracking application 110, e.g., in conjunction with processor 104, memory 106, etc., can update the indication of the memory resource utilization based at least in part on the multiple indications. In one example, logging component 144 can log the multiple indications of memory resource accessing or otherwise update corresponding metrics for subsequently updating the indication of memory resource utilization. In another example, usage displaying component 146, e.g., via processor 104, 214, memory 106, 216, etc., can update the indication of memory resource utilization based at least in part on the multiple indications. For example, usage displaying component 146 can receive a notification (e.g., via a callback, response to a request based on a refresh from usage displaying component 146, etc.) to update the indication of memory resource utilization, where the notification can be received based at least in part on the multiple indications. This can allow for providing a display, via an interface, indicating various memory resource utilization metrics, as described further herein, for analyzing memory usage by the GPU 114 during a duration where the GPU 114 processes rendering instructions sent by the application 148. As described, the indications of memory resource utilization may include a list of unutilized memory resources (e.g., as optionally determined in action 312), which may be indicated for a given GPU resource, all GPU resources, etc., a number of memory accesses performed by a given GPU resource, a size of memory allocated for the GPU resource, etc.

Moreover, for example, logging component 144 can log the updated indication of memory resource utilization for subsequently retrieving. This can allow the usage displaying component 146 to query memory tracking application 110 for memory accesses occurring in a past time period rather than only a real-time (or near real-time) view of resources utilized by the GPU 114 and/or one or more corresponding GPU resources. In another example, usage displaying component 146 may include logic to identify and report unutilized or underutilized resources, as described, and may be configured to offer tips for streamlining memory usage by a corresponding GPU resource, offer additional content to render, etc.

FIG. 4 illustrates an example of an interface 400 for displaying memory resource utilization by a GPU 114 (e.g., on a display device) in accordance with aspects described herein. For example, usage displaying component 146 can display interface 400 based on receiving corresponding data from memory tracking application 110, as described above. As shown, for example, interface 400 can include multiple indications of memory resource utilization, which may include a list of memory resources 402 (e.g., pages of memory) allocated for the GPU 114, or by a certain GPU resource(s) (e.g., shader, texture, etc.) along with various information regarding the memory resources, such as virtual address, size, format, width, height, Mip (or Mipmap) utilization in computer graphics processing, etc. Thus, during or after application 148 provides rendering instructions to the GPU 114 for a duration, the list of memory resources 402 can provide an indication of the allocated resources and/or a level of utilization of the resources allocated for the GPU 114, or certain GPU resource(s), to allow for determining unutilized or underutilized resources, as described. The interface 400 can provide other information as well, such as GPU utilization information, frame duration, fault detection, etc., CPU utilization information, graphics API (e.g., Direct3D) utilization information, etc., over the duration, as depicted.

For example, the interface 400 can include a start or initialize feature (or may automatically start upon executing the interface 400) to cause initialization of memory tracking. In any case, once started, interface 400 can receive and display a list of allocated memory resources for one or more GPU resources that are executing on the GPU 114 based on rendering instruction from application 148, which may be initially displayed in the list of memory resources 402. In one example, interface 400 can be specific to one or more GPU resources and/or selectable to gather and provide information related to one or more GPU resources (e.g., one or more shaders, textures, etc., as opposed to necessarily all GPU resources). As the GPU 114 executes to process the rendering instructions, it can call back each time a memory resource is accessed (e.g., based on activating the memory trapping function 122, as described). In one example, this may include calling back to a memory tracking application 110, which may provide indications of memory resource accessing to the interface 400 as received, in a batch, etc. In any case, interface 400 can update the display of the list of memory resources 402 to reflect the memory resource utilization by the GPU 114 and/or certain GPU resource(s) based on receiving (directly or indirectly—i.e., from the memory tracking application 110) the indications from the GPU 114. In this regard, for example, a developer can execute the application 148 to cause the GPU 114 to render images for the application 148 at desired points in time or durations of the application 148, and can utilize interface 400 to determine how memory is (or is not) being used such to detect area for improving efficiency of the way the application 148 utilizes the GPU 114.

As described, for example, resource usage by the GPU 114 can depend on images being rendered and associated rendering instructions, such that geometry comes in as the application providing the rendering instructions is executing (e.g., as a player traverses a level in a game application, such that effects are added in response to player actions etc.). Thus, it may not be possible to accurately capture resource usage in a single GPU capture. In theory, relevant information may be collected using a series of GPU captures, but sorting out resource usage in this regard may be complex. In this regard, interface 400, and corresponding applications and components described herein (e.g., memory tracking application 110, usage displaying component 146, etc.) can be provided to improve efficiency and accuracy of tracking memory resource usage of the GPU 114 caused by the application. For example, as described, the interface 400 can provide information on GPU resources in general and/or for specific shaders, textures, or other PSOs associated with the GPU 114 as well.

Interface 400 can display memory resources currently used by the GPU 114 based on the rendering instructions from the application 148. The memory tracking application 110 can detect when and how each resource is accessed using the GPU 114 memory trapping function 122, as described, which can continually report usage. The memory tracking application 110 and/or usage displaying component 146 can indicate any resources that are not used at all (e.g., allocated but not accessed) or only partially used (e.g., as indicated by Mip Utilization). Usage reporting can depend on the type of resource tracked. This can enable developers to identify the minimal set of resources (and thus memory usage) needed for the application 148. In one example, interface 400 can provide an option to pause the title, which can refer to an executing instance of the application 148 on the GPU 114 to process the corresponding rendering instructions. When this is paused, each of the resources can be inspected in detail by querying the title (e.g., the instance of the application 148 on the GPU 114 executing the rendering instructions) directly to obtain a list of allocated and/or accessed memory resources, as described herein. It may be possible that some resources may no longer be available when the title is paused; however, it may be assumed that the majority of resources may be available at this point, and the memory tracking application 110 can provide enough details, e.g., based on the list of memory resources initially received from the GPU 114, to identify the resource even if it has been evicted. In addition, the interface 400 can produce a report listing unused/partially used resources throughout the sessions, which can give the user an ordered list of resources to inspect for potential optimization.

To track active resources the title can be monitored from the beginning; for example, memory tracking application 110 can implement an instrumented driver loaded by the application 148 or corresponding title instance in the GPU 114 to support GPU captures. In one example, the instrumented driver can include the memory trapping function 122. Every time a resource is created or destroyed by the GPU 114, this event can be registered with pointers to the physical resource (e.g., a virtual address corresponding to the physical address of the memory resource). When the memory tracking application 110 connects to the title, a list of the resources collected is transmitted, which can include a list of memory resources allocated by memory allocator 120. If needed, the title may be paused at this point to retrieve additional information for a richer user interface representation. For example, this may allow for accessing memory resources corresponding to the various GPU resources during a paused state such that the memory resources are not deleted while being accessed by the memory tracking application 110. From this point, the memory tracking application 110 (and/or usage displaying component 146) can receive updates on resource usage, as described. If needed, usage can be summarized across multiple frames and reported n batch (e.g., from memory tracking application 110 to usage displaying component 146, as described). Usage can be reported per page and memory tracking application 110 can accordingly map the pages to the corresponding GPU resources (e.g., shader, texture, etc.) for providing appropriate information via interface 400.

Figure 5:
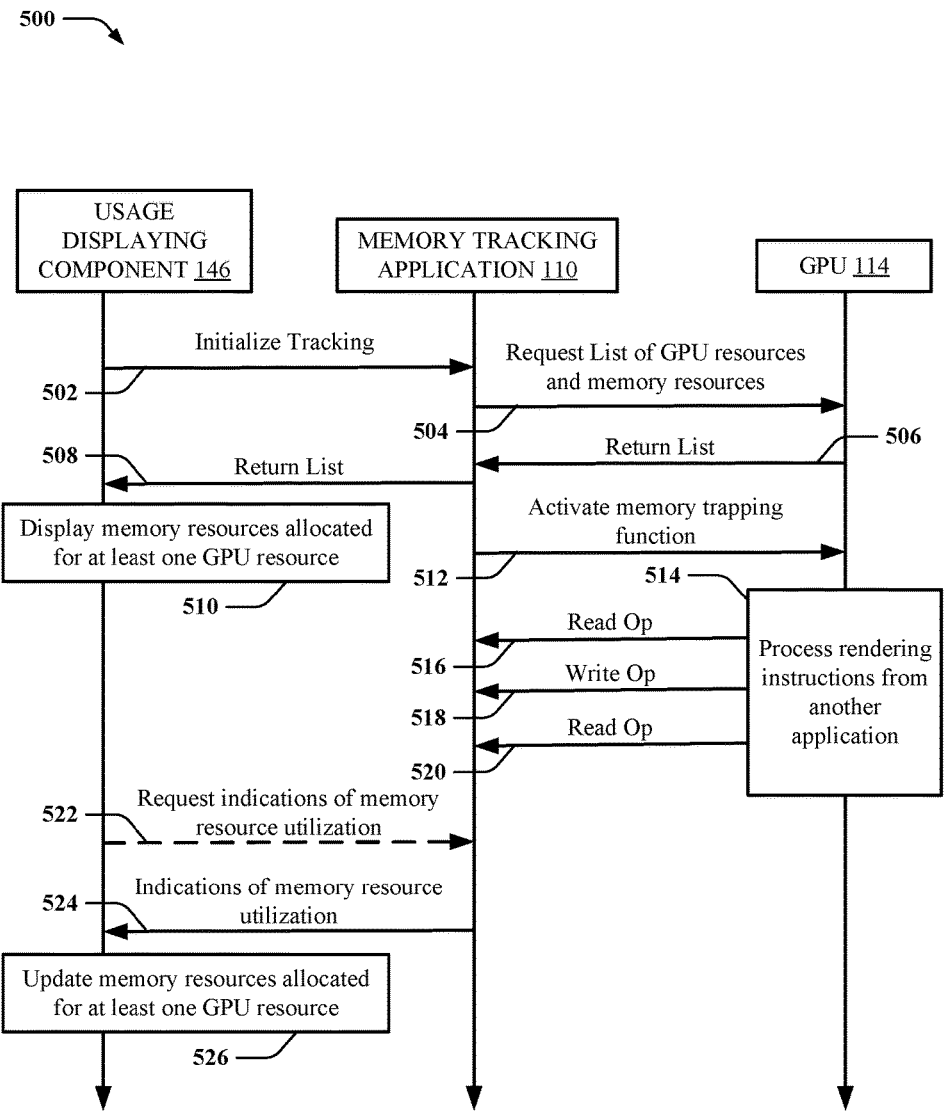
FIG. 5 illustrates a schematic diagram of an example of a communication flow for determining and reporting memory usage by a GPU in accordance with examples described herein.

FIG. 5 illustrates an example of a communication flow 500 for a system for tracking and reporting information related to memory resource utilization by a GPU. A usage displaying component 146, memory tracking application 110, and GPU 114 can communicate to obtain memory resource usage information for the GPU 114 and to report this information by displaying on an interface, as described. In an example, as described, usage displaying component 146, memory tracking application 110, and/or GPU 114 can operate on the same or different systems (e.g., GPU 114 can operate on a console 201, while memory tracking application 110 and usage displaying component 146 operate on the same or different computing device(s) 100, 210, etc.). Thus, in one example, communications between usage displaying component 146, memory tracking application 110, and/or GPU 114 can occur over a system bus, over a communication channel established by one or more computer networks, etc.

At 502, usage displaying component 146 can initialize tracking in the memory tracking application 110, which can be based on initializing a start process in the memory tracking application 110 (e.g., via an option on a provided interface or otherwise instantiating the memory tracking application 110). In another example, usage displaying component 146 can initialize tracking of one or more GPU resources (e.g., not all resources) used by the GPU 114. This can cause memory tracking application 110 to request a list of GPU resources and associated memory resources form the GPU 114. At 506, the GPU 114 can return the list of GPU resources and associated memory resources to the memory tracking application 110. For example, the title can determine the GPU resources initialized by the GPU 114, and can return an indication of the GPU resources along with any memory allocated for the corresponding GPU resources (e.g., via memory allocator 120). Memory tracking application 110 can return the received list of GPU resources and/or allocated memory resources to the usage displaying component 146. In one example, memory tracking application 110 can return a set of selected GPU resources (e.g., as specified by the usage displaying component 146 in the initializing the tracking) and/or the allocated memory resources related to the selected set of GPU resources.

At 510, the usage displaying component 146 can display memory resources allocated for at least one GPU resource (e.g., a selected GPU resource and/or all GPU resources). For example, as described, usage displaying component 146 can display the memory resources via an interface, such as or similar to interface 400, on a display device. In addition, as part of initializing the tracking, memory tracking application 110 can activate a memory trapping function on the GPU 114 (e.g., at least for a portion of memory resources corresponding to one or more specific GPU resources (e.g., as indicated in the initialize tracking command at 502), or all GPU resources. This may include memory tracking application 110 (or GPU 114) setting a bit for each memory resource (e.g., each page) to be trapped by the memory trapping function.

In this regard, for example, GPU 114 can process rendering instructions from another application at 514, such as application 148, and can send trapped memory operations to the memory tracking application 110, such as one or more read operations 516, 520, write operations 518, etc. In this example, GPU 114 can detect the memory operations via the memory trapping function 122, and can notify the memory tracking application 110 of the memory operations via callback component 142. GPU 114 can indicate the type of operation, memory (page) address, etc., in the callback. Memory tracking application 110 can accordingly map the operations to specific GPU resources based on identifying the modified memory resource (e.g., page) associated with the operations, and can provide indications of memory resource utilization for one or more GPU resources to the usage displaying component 146 at 524. In one example, memory tracking application 110 can provide the indications of memory resource utilization to the usage displaying component 146 at 524 as the callbacks are received for each operation 516, 518, 520. In another example, memory tracking application 110 can provide the indications of memory resource utilization to the usage displaying component 146 at 524 based on an optional request from the usage displaying component 146 at 522 (and can provide the indications that have accrued since the last request). In another example, memory tracking application 110 can provide the indications of memory resource utilization to the usage displaying component 146 at 524 according to a specific period of time (and can provide indications that have accrued since a last transmission of the indications), etc.

In any case, usage displaying component 146 can update the memory resources allocated for at least one GPU resource at 526, which can include updating an interface, such as interface 400 and/or the associated list of memory resources 402, to reflect the list of memory resources being utilized by one or more (or all) GPU resources. In one example, actions 514, 516, 518, 520, 522, 524, 526 can repeat until the memory trapping function is deactivated, until the title is paused, until memory tracking application 110 and/or usage displaying component 146 are terminated, and/or the like. In yet another example, providing the indications of memory resource utilization at 524 can similarly be held until the memory trapping function is deactivated, until the title is paused, until memory tracking application 110 and/or usage displaying component 146 are terminated, and/or the like. Thus, for example, a developer can execute the application 148 for a duration and/or can execute certain desired portions of the application, and can view memory resource usage by the GPU 114 for the duration based on the interface displayed by the usage displaying component 146.

Figure 6:
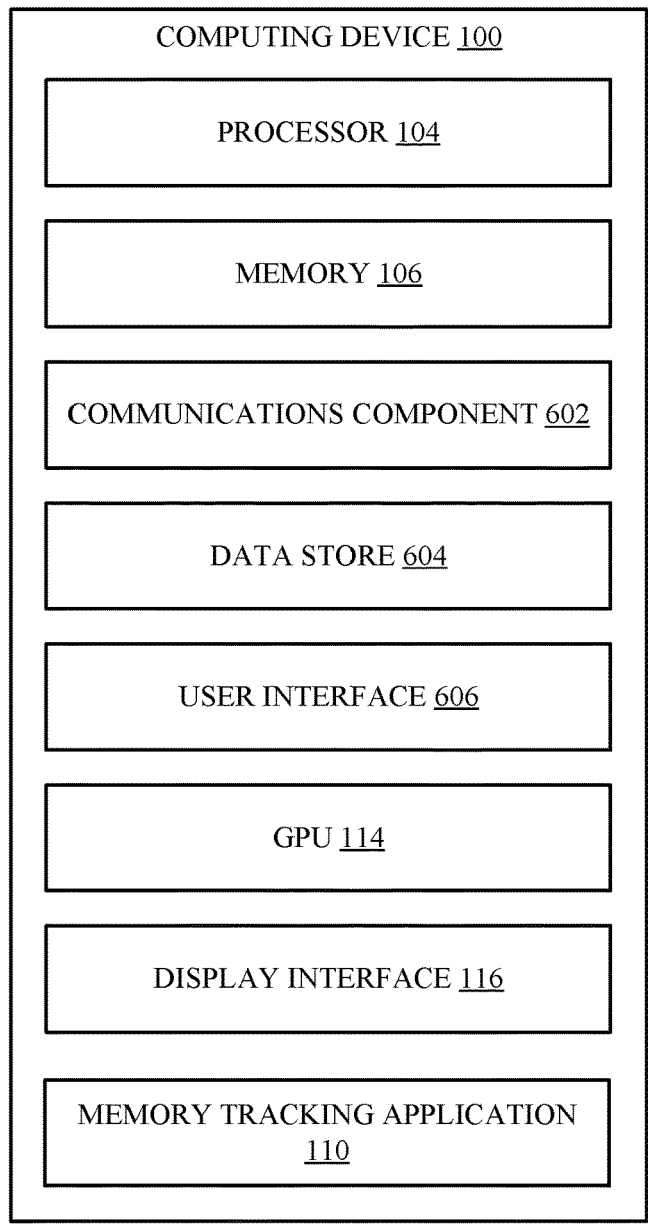
FIG. 6 is a schematic diagram of an example of a computing device for performing functions described herein.

FIG. 6 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, such as memory tracking application 110 and/or components thereof, display drivers, etc., as described herein, and/or other components of the computing device 100.

Further, computing device 100 may include a communications component 602 that provides for establishing and maintaining communications with one or more other devices, parties, entities, etc. utilizing hardware, software, and services as described herein. Communications component 602 may carry communications between components on computing device 100, as well as between computing device 100 and external devices, such as devices located across a communications network and/or devices serially or locally connected to computing device 100. For example, communications component 602 may include one or more buses, and may further include transmit chain components and receive chain components associated with a wireless or wired transmitter and receiver, respectively, operable for interfacing with external devices. For example, communications component 602 can catty communications between memory tracking application 110 and a GPU on another device, between distributed components of memory tracking application 110 (e.g., to/from a separately located usage displaying component 146, etc.).

Additionally, computing device 100 may include a data store 604, which can be any suitable combination of hardware and/or software, that provides for mass storage of information, databases, and programs employed in connection with examples described herein. For example, data store 604 may be or may include a data repository for applications and/or related parameters not currently being executed by processor 104. In addition, data store 604 may be a data repository for an operating system, application, such as memory tracking application 110 and/or components thereof, display driver, etc. executing on the processor 104, and/or one or more other components of the computing device 100.

Computing device 100 may also include a user interface component 606 operable to receive inputs from a user of computing device 100 and further operable to generate outputs for presentation to the user (e.g., via display interface 116 to a display device). User interface component 606 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 606 may include one or more output devices, including but not limited to a display interface 116, a speaker, a haptic feedback mechanism, a printer, any other mechanism capable of presenting an output to a user, or any combination thereof. In an example, user interface component 606 can display or can include interface 400 or similar interfaces to display memory usage information, as described herein.

Computing device 100 can also include a GPU 114, as described herein, for rendering images based on rendering instruction received from processor 104. GPU 114 can additional send signals via a display interface 116 to cause display of the rendered images on a display (not shown). Additionally, computing device 100 may include a memory tracking application 110, as described herein, to track and capture utilization of memory (e.g., memory 106) in performing graphics processing operations. For example, memory tracking application 110 can track memory allocated and/or modified by one or more GPU processes, as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for reporting memory resource usage by a graphics processing unit (GPU), comprising:
   receiving, by a memory tracking application, a list of memory resources allocated for the GPU;
   displaying, by the memory tracking application, an indication of memory resource utilization based on the list of memory resources;
   receiving, by the memory tracking application and as transmitted by the GPU executing on a separate device from the memory tracking application, multiple indications that one or more of the memory resources allocated for the GPU are accessed; and
   updating, by the memory tracking application, the indication of memory resource utilization based at least in part on the multiple indications.

2. The method of claim 1, further comprising activating a memory trapping function to cause the GPU to report the multiple indications.

3. The method of claim 2, wherein activating the memory trapping function comprises providing an interrupt channel to the GPU, wherein the multiple indications are received from the GPU over the interrupt channel.

4. The method of claim 3, wherein the multiple indications are separately received, from the GPU over the interrupt channel, and wherein updating the multiple indications comprises providing, by the memory tracking application, at least two of the multiple indications to an interface in a batch.

5. The method of claim 2, wherein the memory resources each correspond to a page of memory, and wherein the memory trapping function causes the GPU to report accessing the given page of memory.

6. The method of claim 1, further comprising determining one or more unutilized memory resources from the list of memory resources as not indicated in the multiple indications, wherein updating the indication of memory resource utilization includes displaying a list of the one or more unutilized memory resources.

7. The method of claim 1, further comprising identifying a GPU resource associated with the one or more of the memory resources that are accessed, wherein displaying the indication of memory resource utilization comprises displaying an identification of the GPU resource.

8. The method of claim 7, wherein the GPU resource corresponds to a texture or a shader executed by the GPU.

9. A computing device for reporting memory resource usage by a graphics processing unit (GPU), comprising:
   a memory storing one or more parameters or instructions for executing an operating system and one or more applications including a memory tracking application; and
   at least one processor coupled to the memory, wherein the at least one processor is configured to:
      receive, by the memory tracking application, a list of memory resources allocated for the GPU;
      display, by the memory tracking application, an indication of memory resource utilization based on the list of memory resources;
      receive, by the memory tracking application and as transmitted by the GPU executing on a separate device from the memory tracking application, multiple indications that one or more of the memory resources allocated for the GPU are accessed; and
      update, by the memory tracking application, the indication of memory resource utilization based at least in part on the multiple indications.

10. The computing device of claim 9, wherein the at least one processor is further configured to activate a memory trapping function to cause the GPU to report the multiple indications.

11. The computing device of claim 10, wherein the at least one processor is configured to activate the memory trapping function at least in part by providing an interrupt channel to the GPU, wherein the multiple indications are received from the GPU over the interrupt channel.

12. The computing device of claim 11, wherein the multiple indications are separately received, from the GPU over the interrupt channel, and wherein the at least one processor is configured to update the multiple indications at least in part by providing, by the memory tracking application, at least two of the multiple indications to an interface in a batch.

13. The computing device of claim 10, wherein the memory resources each correspond to a page of memory, and wherein the memory trapping function causes the GPU to report accessing the given page of memory.

14. The computing device of claim 9, wherein the at least one processor is further configured to determine one or more unutilized memory resources from the list of memory resources as not indicated in the multiple indications, wherein the at least one processor is configured to update the indication of memory resource utilization at least in part by displaying a list of the one or more unutilized memory resources.

15. The computing device of claim 9, wherein the at least one processor is further configured to identify a GPU resource associated with the one or more of the memory resources that are accessed, wherein the at least one processor is configured to display the indication of memory resource utilization at least in part by displaying an identification of the GPU resource.

16. The computing device of claim 15, wherein the GPU resource corresponds to a texture or a shader executed by the GPU.

17. A non-transitory computer-readable medium, comprising code executable by one or more processors for reporting memory resource usage by a graphics processing unit (GPU), the code comprising code for:
receiving, by a memory tracking application, a list of memory resources allocated for the GPU;
displaying, by the memory tracking application, an indication of memory resource utilization based on the list of memory resources;
receiving, by the memory tracking application and as transmitted by the GPU executing on a separate device from the memory tracking application, multiple indications that one or more of the memory resources allocated for the GPU are accessed; and
updating, by the memory tracking application, the indication of memory resource utilization based at least in part on the multiple indications.

18. The non-transitory computer-readable medium of claim 17, further comprising code for activating a memory trapping function to cause the GPU to report the multiple indications.

19. The non-transitory computer-readable medium of claim 17, further comprising code for determining one or more unutilized memory resources from the list of memory resources as not indicated in the multiple indications, wherein the code for updating updates the indication of memory resource utilization at least in part by displaying a list of the one or more unutilized memory resources.

20. The non-transitory computer-readable medium of claim 17, further comprising code for identifying a GPU resource associated with the one or more of the memory resources that are accessed, wherein the code for displaying displays the indication of memory resource utilization at least in part by displaying an identification of the GPU resource.

* * * * *